（12）United States Patent
Kim et al.

(10) Patent No.: US 7,843,481 B2
(45) Date of Patent: Nov. 30, 2010

(54) LIGHT SCANNING DEVICE CAPABLE OF PRODUCING NON-COPLANAR SCANNING LINES

(75) Inventors: Hyung Soo Kim, Suwon-Si (KR); Sun Min Kin, Yongin-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/252,856

(22) Filed: Oct. 16, 2008

(65) Prior Publication Data

US 2009/0175656 A1    Jul. 9, 2009

(30) Foreign Application Priority Data

Jan. 9, 2008    (KR) .................. 10-2008-0002405

(51) Int. Cl.
  *B41J 15/14*    (2006.01)
  *B41J 27/00*    (2006.01)
(52) U.S. Cl. ........................ 347/243; 347/260
(58) Field of Classification Search ............ 347/225, 347/233, 241–243, 256, 257, 231, 259–261
See application file for complete search history.

(56) References Cited

U.S. PATENT DOCUMENTS 5,450,119 A * 9/1995 Hinton et al. .............. 347/242
2008/0094678 A1* 4/2008 Uduki ..................... 359/204

FOREIGN PATENT DOCUMENTS

JP    2003211728 A * 7/2003

* cited by examiner

*Primary Examiner*—Hai C Pham
(74) *Attorney, Agent, or Firm*—Stanzione & Kim LLP

(57) ABSTRACT

An image forming apparatus having improved arrangement of photosensitive members and configuration of a light scanning device to enable size reduction is described. The image forming apparatus includes a plurality of photosensitive members, a light scanning device to irradiate light beams to the plurality of photosensitive members, so as to form electrostatic latent images on the photosensitive members, a plurality of developers to supply a developing agent to the photosensitive members, so as to form visible images on the photosensitive members, and a transfer drum disposed in contact with the photosensitive members and used to transfer the visible images such that the visible images overlap one another. Scanning lines, which are formed on the plurality of photosensitive members, respectively, by the light scanning device, are arranged in at least two different planes.

10 Claims, 9 Drawing Sheets

LIGHT SCANNING DEVICE CAPABLE OF PRODUCING NON-COPLANAR SCANNING LINES

CROSS-REFERENCE TO RELATED APPLICATION

This application claims the benefit of Korean Patent Application No. 2008-0002405, filed on Jan. 9, 2008 in the Korean Intellectual Property Office, the disclosure of which is incorporated herein by reference.

BACKGROUND OF THE INVENTION

1. Field of the Invention

The present invention relates to an image forming apparatus, and, more particularly, to an image forming apparatus having a configuration suitable for size reduction.

2. Description of the Related Art

An image forming apparatus is an apparatus to form an image on a printing medium. Examples of the image forming apparatus include, e.g., printers, copiers, facsimiles, and devices with some combination of functions of these.

A color image forming apparatus adopting an electronic photography may be a type that are often referred to as a "tandem image forming apparatus." A tandem image forming apparatus has photosensitive members provided in equal number to the number of colors of toners used in printing. Most commonly, a color image forming apparatus uses four toner colors, specifically, yellow, magenta, cyan, and black. Therefore, the tandem image forming apparatus includes four photosensitive members corresponding to the respective colors.

FIG. 1 is a view schematically illustrating a configuration of a conventional tandem image forming apparatus. As shown in FIG. 1, the conventional tandem image forming apparatus 1 includes a plurality of photosensitive members 2K, 2C, 2M, and 2Y, a light scanning device 3 to form electrostatic latent images on the photosensitive members by scanning the respective photosensitive members, and a plurality of developers 4K, 4C, 4M, and 4Y.

The photosensitive members 2K, 2C, 2M, and 2Y are arranged in vertical alignment with respect to each other, each being rotatable, and contacting the intermediate transfer belt 5.

The light scanning device 3 includes a first scanning optical system 3a having a first light deflector 3c, and a second scanning optical system 3b having a second light deflector 3d. Light beams, emitted from a first light source (not shown) and a second light source (not shown) of the first scanning optical system 3a, are deflected, from the first light deflector 3c, into different directions. Then, the deflected light beams are introduced to the first photosensitive member 2K and second photosensitive member 2C via reflecting mirrors 3e and 3f, producing an electrostatic latent image on each of the photosensitive members. Also, light beams, emitted from a third light source (not shown) and a fourth light source (not shown) of the second scanning optical system 3b, are deflected, from the second light deflector 3d, into different directions. Then, the deflected light beams are introduced to the third photosensitive member 2M and fourth photosensitive member 2Y via reflecting mirrors 3g and 3h, producing an electrostatic latent image on each of the photosensitive members.

The developers 4K, 4C, 4M, and 4Y supply a developing agent to the electrostatic latent images formed on the respective photosensitive members 2K, 2C, 2M, and 2Y, to develop the electrostatic latent images into visible images. The resulting visible images on the respective photosensitive members 2K, 2C, 2M, and 2Y are sequentially transferred to the intermediate transfer belt 5 in such a manner that they overlap one another. As a result, a completed color image is formed on intermediate transfer belt 5. The color image is finally transferred to a printing medium S passing through a gap between the intermediate transfer belt 5 and a transfer roller 6.

The above-described tandem image forming apparatus is advantageous for high-speed printing. However, due to the fact that photosensitive members must be provided in equal number to the number of colors of toner and the fact that there is a need for optical systems to scan the respective photosensitive members, tandem image forming apparatuses tend to be large in size.

In particular, in the configuration as shown in FIG. 1, in which the photosensitive members 2K, 2C, 2M, and 2Y are in the vertical in-line arrangement, it is difficult to reduce the overall height of the image forming apparatus, and exacerbates the difficulties in reducing the size of the image forming apparatus.

Furthermore, when using the intermediate transfer belt 5 as shown in FIG. 1, vibration caused during circulation of the belt 5 may make it difficult to achieve accurate color registration, and consequently, to achieve a high-quality print image.

BRIEF DESCRIPTION OF THE DRAWINGS

Various aspects and advantages of the embodiments of the invention will become apparent and more readily appreciated from the following description of the embodiments, taken in conjunction with the accompanying drawings, of which.

DETAILED DESCRIPTION OF THE PREFERRED EMBODIMENTS

Figure 1:
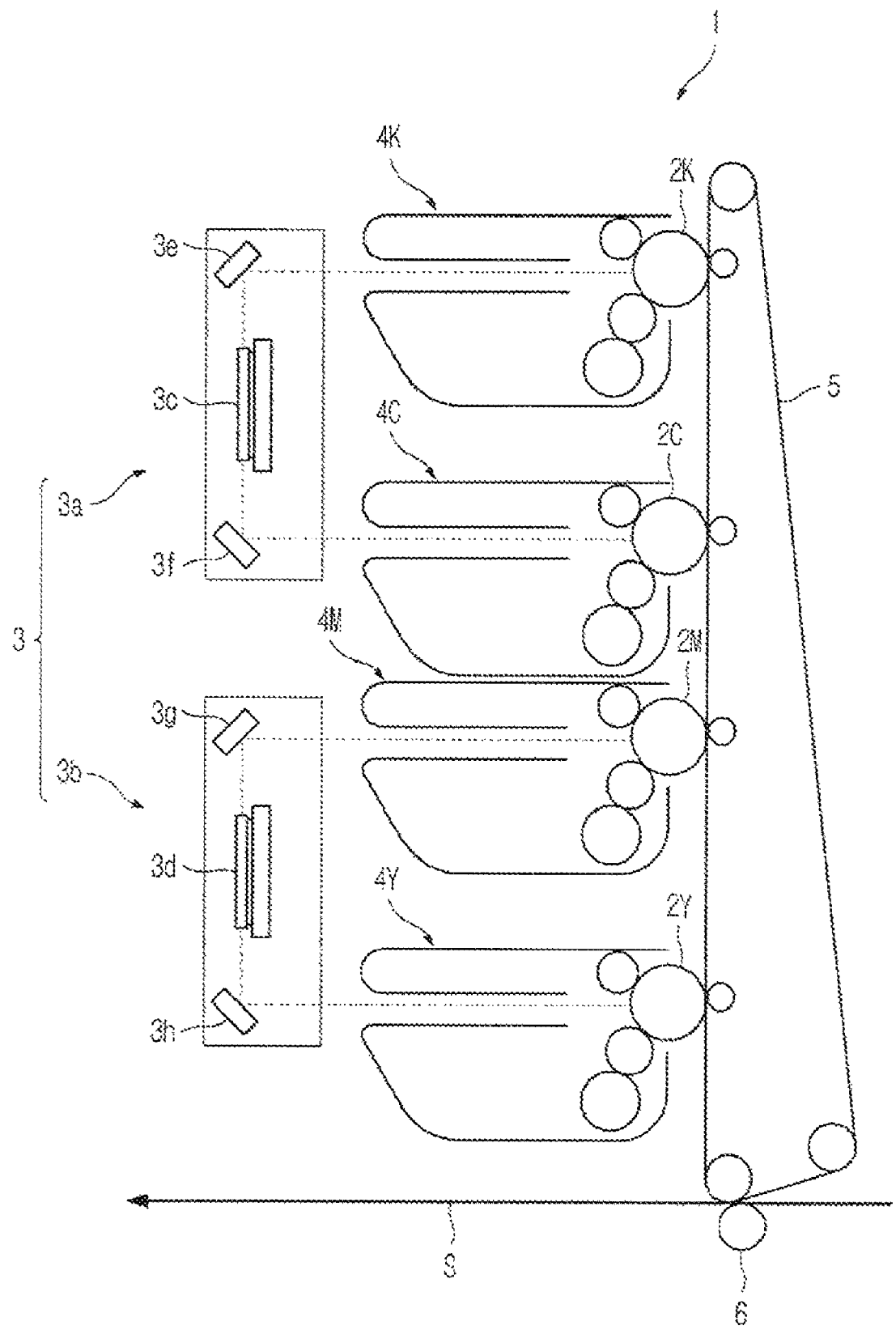
FIG. 1 is a view schematically illustrating a configuration of a legacy tandem image forming apparatus.

Reference will now be made in detail to exemplary embodiments of the present invention, examples of which are illustrated in the accompanying drawings, wherein like reference numerals refer to like elements throughout. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail. It should be noted that in the drawings, the dimensions of the features are not intended to be to true scale, and may be exaggerated for the sake of allowing greater understanding.

Figure 2:
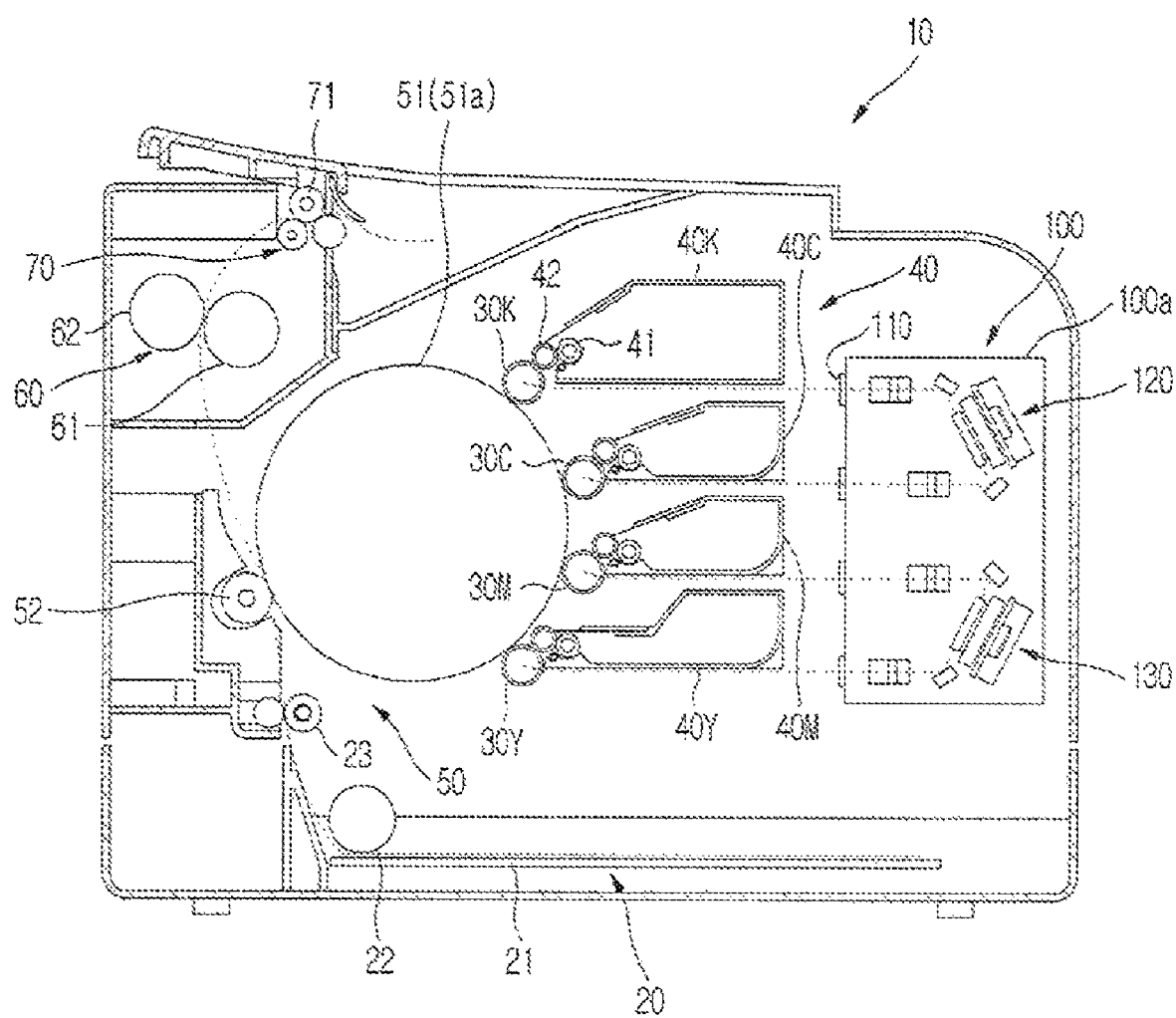
FIG. 2 is a view illustrating a configuration of an image forming apparatus according to a first embodiment of the present invention.
Figure 3:
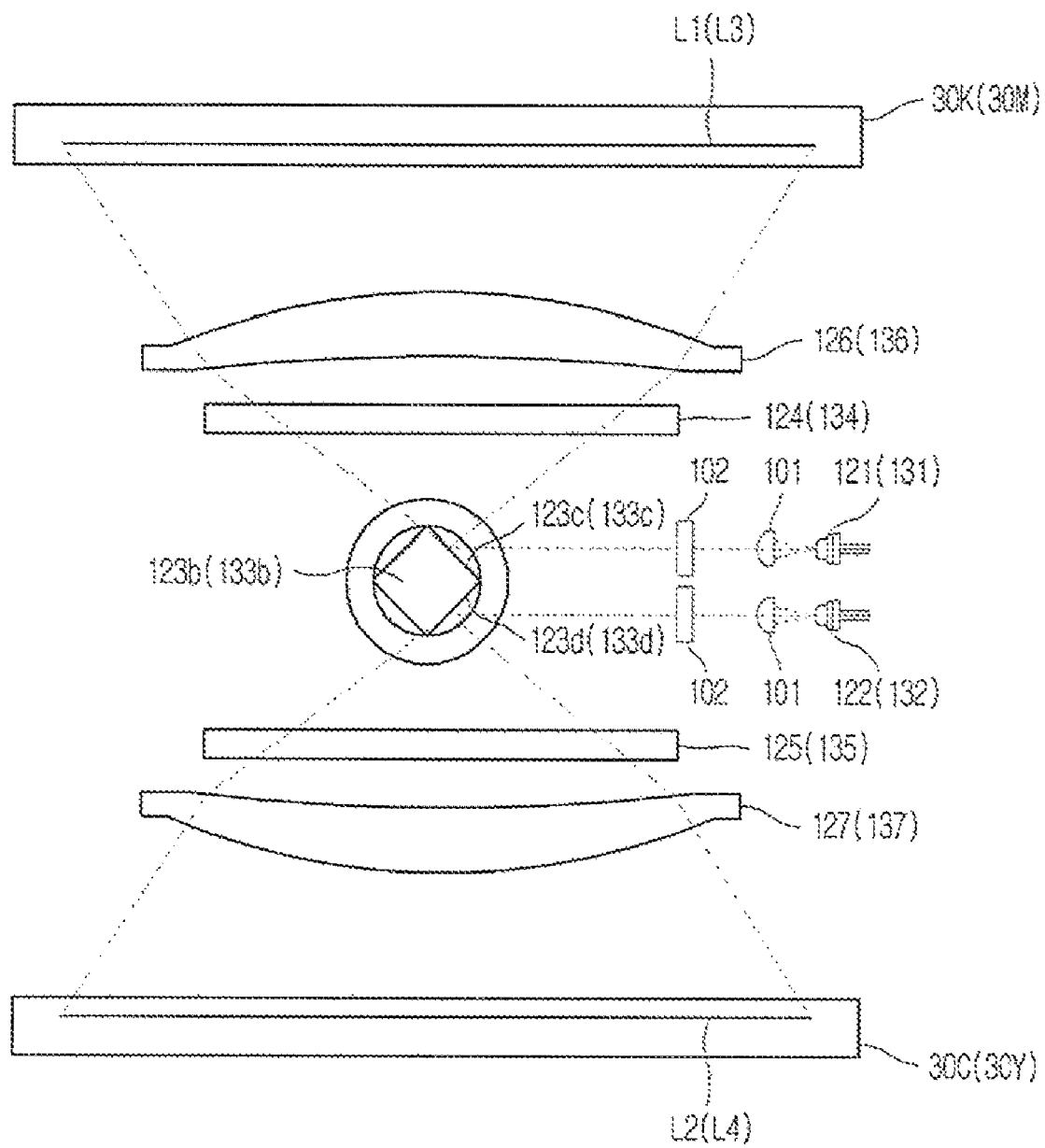
FIG. 3 is a view illustrating a configuration of a light scanning device provided in the image forming apparatus of FIG. 2.
Figure 4:
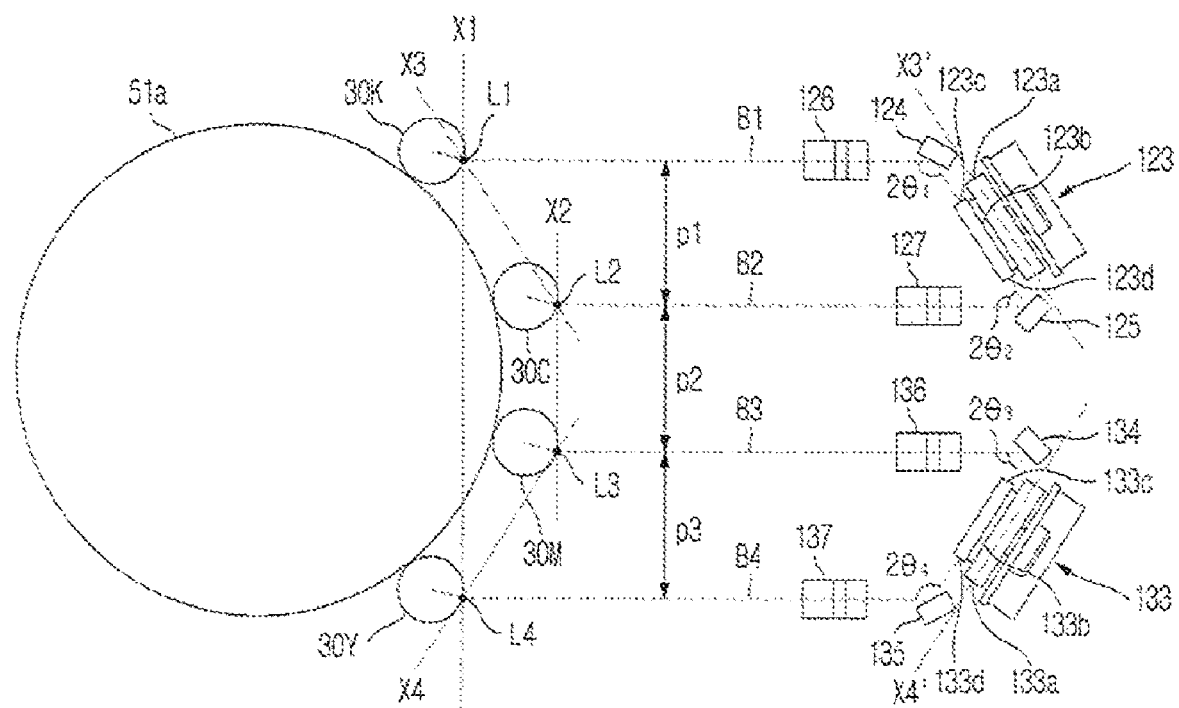
FIG. 4 is a view illustrating the configuration of relevant portions of the image forming apparatus of FIG. 2.

FIG. 2 is a view illustrating a configuration of an image forming apparatus according to a first embodiment of the present invention. FIG. 3 is a view illustrating a configuration of the light scanning device provided in the image forming apparatus of FIG. 2. FIG. 4 is a view illustrating the configuration relevant portions of the image forming apparatus of FIG. 2.

As shown in FIG. 2, the image forming apparatus 10 may include a printing medium supply device 20, a plurality of photosensitive members 30K, 30C, 30M, and 30Y, a light scanning device 100, a developing device 40, a transfer device 50, a fixing device 60, and a printing medium discharge device 70.

The printing medium supply device 20 includes a tray 21, in which a printing medium is loaded, and a pickup roller 22 to pick up the printing medium loaded in the tray 21 sheet by sheet. The printing medium, picked up by the pickup roller 22, is delivered to the transfer device 50 by a delivery roller 23.

The light scanning device 100 irradiates light beams to the photosensitive members 30K, 30C, 30M, and 30Y, to form electrostatic latent images on surfaces of the photosensitive members 30K, 30C, 30M, and 30Y. A detailed description of the light scanning device 100 will follow.

The developing device 40 supplies developing agent to the electrostatic latent images formed on the photosensitive members 30K, 30C, 30M, and 30Y, so as to form visible images. The developing device 40 includes four developers 40K, 40C, 40M, and 40Y, which receive different colors of toners, for example, black toner K, cyan toner C, magenta toner M, and yellow toner Y, respectively.

Each of the developers 40K, 40C, 40M, and 40Y may include a feed roller 41 and a developing roller 42. The feed roller 41 supplies the developing agent to the developing roller 42. The developing roller 42 supplies the developing agent to the associated photosensitive member, to develop the electrostatic latent image of the photosensitive member into a visible image.

The transfer device 50 includes an intermediate transfer member 51 and a transfer roller 52. The visible images formed on the photosensitive members 30K, 30C, 30M, and 30Y are transferred to the intermediate transfer member 51 in such a manner that the images overlap one another. The resulting overlapped color image is transferred to a printing medium, which passes through a gap between the transfer roller 52 and the intermediate transfer member 51.

The intermediate transfer member 51 may be a transfer drum 51a, which rotates in contact with the photosensitive members 30K, 30C, 30M, and 30Y. Using the transfer drum 51a as the intermediate transfer member 51 can advantageously reduce the size of the image forming apparatus 10, and may improve the reliability of transfer operation, thus resulting in greater accuracy of color registration.

The printing medium, having passed through the transfer device 50, is introduced to the fixing device 60. The fixing device 60 includes a heating roller 61 and a pressing roller 62. As the printing medium, having the transferred image, passes through a gap between the heating roller 61 and the pressing roller 62, the image is fixed to the printing medium by heat and pressure.

The printing medium, having passed through the fixing device 60, is guided to the printing medium discharge device 70, and in turn, is discharged from the image forming apparatus 10 by a discharge roller 71.

As shown in FIGS. 2 to 4, the light scanning device 100 is used to irradiate light beams, which correspond to image information of different colors, for example, black K, cyan C, magenta M, and yellow Y, to the respective photosensitive members 30K, 30C, 30M, and 30Y. Hereinafter, when it is necessary to distinguish the photosensitive members 30K, 30C, 30M, and 30Y, they are referred to as a first photosensitive member 30K, second photosensitive member 30C, third photosensitive member 30M, and fourth photosensitive member 30Y.

The light scanning device 100 includes a housing 100a having light transmitters 110 to emit light beams to the outside of the housing 100a, and first and second scanning optical systems 120 and 130 provided in the housing 100a.

The first scanning optical system 120 emits light beams to any two of the photosensitive members 30K, 30C, 30M, and 30Y, for example, the first photosensitive member 30K and second photosensitive member 30C. The second scanning optical system 130 emits light beams to any two of the photosensitive members 30K, 30C, 30M, and 30Y, for example, the third photosensitive member 30M and fourth photosensitive member 30Y.

The first scanning optical system 120 includes a first light source 121, a second light source 122, a first light deflector 123, a first reflecting mirror 124, a second reflecting mirror 125, a first F-theta lens 126, and a second F-theta lens 127. The first light deflector 123 is used to deflect light beams emitted from the first light source 121 and second light source 122. The first light deflector 123 includes a drive motor 123a and a first polygonal mirror 123b to be rotated by the drive motor 123a.

The light beam emitted from the first light source 121 is deflected by the first face 123c of the first polygonal mirror 123b, to be directed to the first reflecting mirror 124. Then, the deflected light beam is reflected, by the first reflecting mirror 124, to the first photosensitive member 30K. As the reflected light beam is collected on the first photosensitive member 30K by the first F-theta lens 126, a first scanning line L1 is formed on the first photosensitive member 30K.

The light beam emitted from the second light source 122 is deflected by the second face 123d of the first polygonal mirror 123b, to be directed to the second reflecting mirror 125. Then, the deflected light beam is reflected, by the second reflecting mirror 125, to the second photosensitive member 30C. As the reflected light beam is collected on the second photosensitive member 30C by the second F-theta lens 127, a second scanning line L2 is formed on the second photosensitive member 30C.

The second scanning optical system 130 includes a third light source 131, a fourth light source 132, a second light deflector 133, a third reflecting mirror 134, a fourth reflecting mirror 135, a third F-theta lens 136, and a fourth F-theta lens 137. The second light deflector 133 is used to deflect light beams emitted from the third light source 131 and fourth light source 132. The second light deflector 133 includes a drive motor 133a and a second polygonal mirror 133b to be rotated by the drive motor 133a.

The light beam emitted from the third light source 131 is collected on the third photosensitive member 30M by way of the first face 133c of the second polygonal mirror 133b, third reflecting mirror 134, and third F-theta lens 136, thereby causing a third scanning line L3 to be formed on the third photosensitive member 30M. Also, the light beam emitted from the fourth light source 132 is collected on the fourth photosensitive member 30Y by way of the second face 133d of the second polygonal mirror 133b, fourth reflecting mirror 135, and fourth F-theta lens 137, thereby causing a fourth scanning line L4 to be formed on the fourth photosensitive member 30Y Four sets of a collimating lens 101 and a cylindrical lens 102 may also be provided, respectively, in light paths between the first light source 121 and the first light deflector 123, between the second light source 122 and the first light deflector 123, between the third light source 131 and the second light deflector 133, and between the fourth light source 132 and the second light deflector 133. The collimating lens 101 collects the light beam emitted from the light source, making a parallel light beam or converged light beam. The cylindrical lens 102 converts the light beam, having passed through the collimating lens 101, into a linear light beam.

As shown in FIGS. 2 to 4, the photosensitive members 30K, 30C, 30M, and 30Y are not in a vertical in-line arrangement. The scanning lines L1, L2, L3, and L4, formed on the photosensitive members 30K, 30C, 30M, and 30Y by the light scanning device 100, are arranged in at least two different planes. For example, as shown in FIG. 4, it is preferable that the first scanning line L1 on the first photosensitive member 30K and the fourth scanning line L4 on the fourth photosensitive member 30Y be arranged in a first plane X1 while the second scanning line L2 on the second photosensitive member 30C and the third scanning line L3 on the third photosensitive member 30M are arranged in a second plane X2, which is different from the first plane X1.

When the scanning lines L1, L2, L3, and L4 of the photosensitive members 30K, 30C, 30M, and 30Y are arranged in at least two different planes as described above, it is possible to reduce the distances p1, p2, and p3 between light beams B1, B2, B3, and B4 without interference between the photosensitive members 30K, 30C, 30M, and 30Y and peripheral elements or between the respective peripheral elements. Accordingly, the above-described arrangement is capable of advantageously reducing the size of the image forming apparatus 10.

In consideration of the fact that the first scanning line L1 of the first photosensitive member 30K and the second scanning line L2 of the second photosensitive member 30C are arranged in different planes, the first light deflector 123 of the first scanning optical system 120 is oriented obliquely with respect to a vertical direction. Also, in consideration of the fact that the third scanning line L3 of the third photosensitive member 30M and the fourth scanning line L4 of the fourth photosensitive member 30Y are arranged in different planes, the second light deflector 133 of the second scanning optical system 130 is oriented obliquely with respect to a vertical direction. That is, the first light deflector 123 and second light deflector 133 are arranged in two different planes.

The first light deflector 123 is arranged in a plane X3' parallel to a plane X3, on which both the first scanning line L1 of the first photosensitive member 30K and the second scanning line L2 of the second photosensitive member 30C are contained. The first reflecting mirror 124 and second reflecting mirror 125 are arranged such that they can reflect the light beams B1 and B2 deflected from the first light deflector 123, along parallel light paths, to the first photosensitive member 30K and second photosensitive member 30C, respectively. In particular, for example, assuming that the light beams, deflected from the first light deflector 123, are directed to the first reflecting mirror 124 and second reflecting mirror 125 by incidence angles $\theta_1$ and $\theta_2$, respectively, the first reflecting mirror 124 and second reflecting mirror 125 are arranged to satisfy the following relational expression (where $\theta_1$ and $\theta_2$ are not equal to each other):

$$2\theta_1 + 2\theta_2 = 180°$$

With the above-described arrangement of the first light deflector 123, first reflecting mirror 124, and second reflecting mirror 125, it is possible to set the length d1 of the light path from the first light deflector 123 to the first photosensitive member 30K to be equal to the length d2 of the light path from the first light deflector 123 to the second photosensitive member 30C, with a fewer number of reflecting mirrors.

Also, the second light deflector 133 is arranged in a plane X4' parallel to a plane X4, on which both the third scanning line L3 of the third photosensitive member 30M and the fourth scanning line L4 of the fourth photosensitive member 30Y are contained. The third reflecting mirror 134 and fourth reflecting mirror 135 are arranged such that they can reflect the light beams B3 and B4 deflected from the second light deflector 133, along parallel light paths, to the third photosensitive member 30M and fourth photosensitive member 30Y, respectively. In particular, for example, assuming that the light beams, deflected from the second light deflector 133, are directed to the third reflecting mirror 134 and fourth reflecting mirror 135 by incidence angles $\theta_3$ and $\theta_4$, respectively, the third reflecting mirror 134 and fourth reflecting mirror 135 are arranged to satisfy the following relational expression (where $\theta_3$ and $\theta_4$ are not equal to each other):

$$2\theta_3 + 2\theta_4 = 180°$$

As a specific example, in FIG. 4, when the transfer drum 51a has a diameter of 120 mm, the photosensitive members 30K, 30C, 30M, and 30Y each having a diameter of 16 mm, and $2\theta_1 = 2\theta_4 = 113.5°$ and $2\theta_2 = 2\theta_3 = 66.5°$, it is possible to achieve a small-size image forming apparatus in which the distances p1, p2, and p3 between the light beams B1, B2, B3, and B4 are each about 33 mm.

Figure 5:
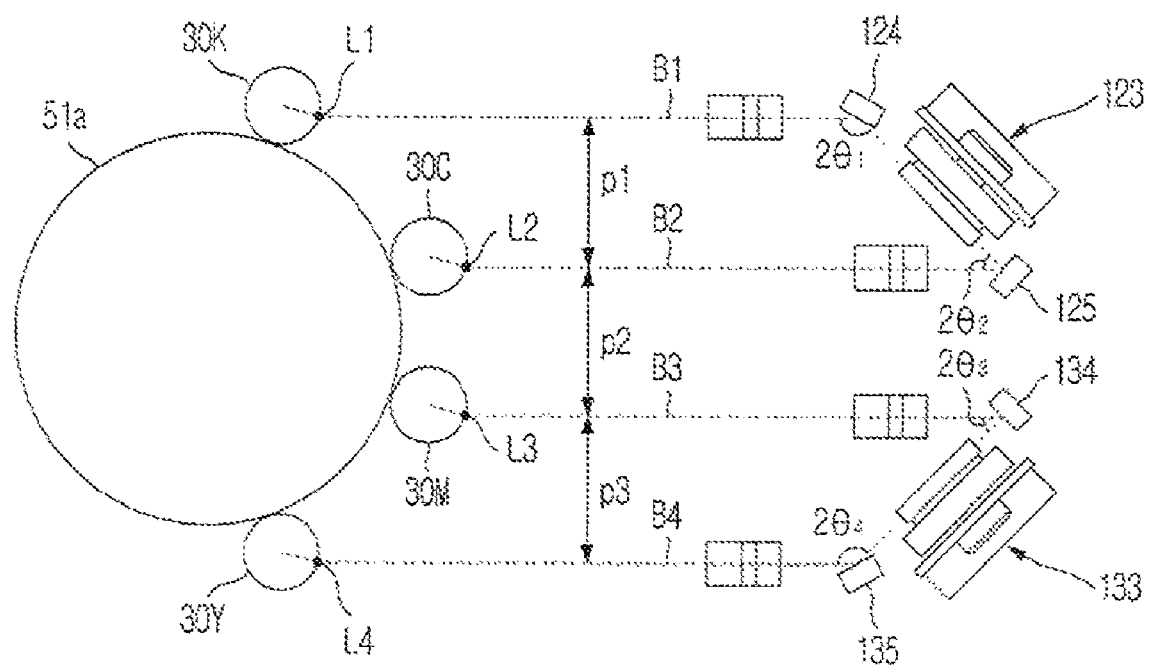
FIG. 5 is a view illustrating an alternative embodiment of FIG. 4, in which the transfer drum has a reduced size and the first and second deflectors have modified installation angles.

FIG. 5 illustrates an another example, in which the transfer drum 51a has a smaller diameter and the first and second light deflectors 123 and 133 have a larger inclination angle, and thus, the distances p1, p2, and p3 between the light beams B1, B2, B3, and B4 are further reduced. In this example, $2\theta_1 = 2\theta_4 = 135°$, $2\theta_2 = 2\theta_3 = 45°$, and the distances p1, p2, and p3 are about 27.2 mm Although the above-described examples illustrate that the distances p1, p2, and p3 between the light beams B1, B2, B3, and B4 have a constant value, it will be appreciated that the distances p1, p2, and p3 may differ from one another according to the particular design requirements. Also, although the above-described examples illustrate that the angles $\theta_1$ and $\theta_4$ are equal to each other and the angles $\theta_2$ and $\theta_3$ are equal to each other, the present embodiments are is not limited to these examples, and $\theta_1$ and $\theta_4$ may differ from each other.

Figure 6:
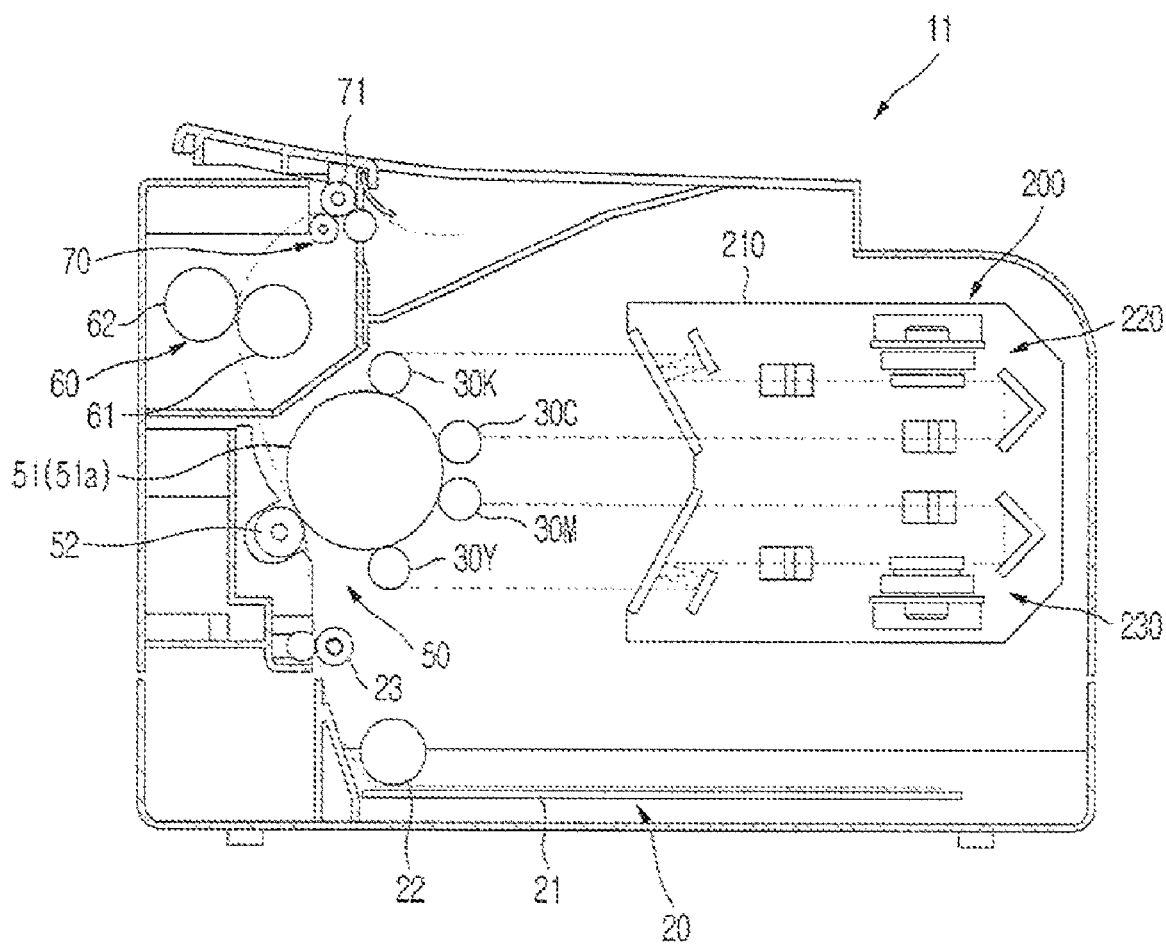
FIG. 6 is a view illustrating a configuration of an image forming apparatus according to a second embodiment of the present invention.
Figure 7:
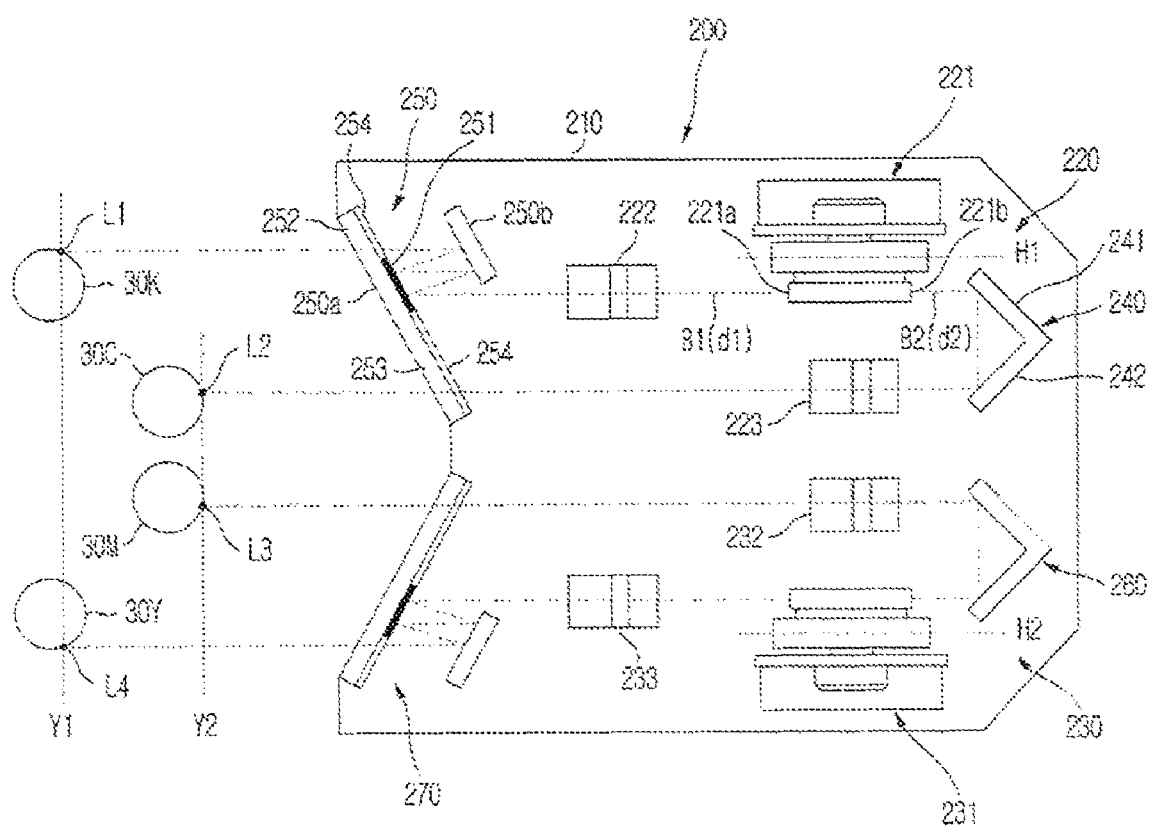
FIG. 7 is a view illustrating a selected partial configuration of the image forming apparatus of FIG. 6.

FIG. 6 is a view illustrating a configuration of an image forming apparatus according to a second embodiment of the present invention, and FIG. 7 is a view illustrating a selected partial configuration of the image forming apparatus of FIG. 6. The present embodiment is substantially similar to the previously described embodiments, except for the features and configuration of the light scanning device 200. Thus, the features and configurations that are commonly shared with the previously described embodiments, e.g., as illustrated in FIG. 2 will be designated by the same reference numerals, and repetition of the descriptions thereof is not necessary.

As shown in FIGS. 6 and 7, the image forming apparatus 11 includes a light scanning device 200, which irradiates light beams to the plurality of photosensitive members 30K, 30C, 30M, and 30Y, to form electrostatic latent images.

The light scanning device 200 includes a housing 210, and first and second scanning optical systems 220 and 230 arranged in the housing 210.

The first scanning optical system 220 includes a first light deflector 221 to deflect light beams emitted from first and second light sources (not shown). The light beams, deflected from the first light deflector 221, are directed to the first photosensitive member 30K and second photosensitive member 30C, thereby forming the first scanning line L1 and second scanning line L2 on the surfaces of the first and second photosensitive members 30K and 30C. F-theta lenses 222 and 223 are installed between the first light deflector 221 and the photosensitive members 30K and 30C, to collect the light beams, deflected from the first light deflector 221, to the first scanning line L1 and second scanning line L2, respectively.

The second scanning optical system 230 includes a second light deflector 231 to deflect light beams emitted from third and fourth light sources (not shown). The light beams, deflected from the second light deflector 231, are directed to the third photosensitive member 30M and fourth photosensitive member 30Y, thereby forming the third scanning line L3 and fourth scanning line L4 on the surfaces of the third and fourth photosensitive members 30M and 30Y. F-theta lenses 232 and 233 are installed between the second light deflector 231 and the photosensitive members 30M and 30Y, to collect the light beams, deflected from the second light deflector 231, to the third scanning line L3 and fourth scanning line L4, respectively.

The scanning lines L1, L2, L3, and L4, formed on the respective photosensitive members 30K, 30C, 30M, and 30Y by the light scanning device 200, are arranged in at least two different planes Y1 and Y2. The first light deflector 221 of the light scanning device 200 is arranged in a first horizontal plane H1, and the second light deflector 231 is arranged in a second horizontal plane H2. This configuration enables compact arrangement of the photosensitive members 30K, 30C, 30M, and 30Y, and can reduce the size of the first and second scanning optical systems 220 and 230, and consequently, the overall size of the image forming apparatus 11.

As the first light deflector 221 is arranged horizontally, the light beam B1 deflected from the first face 221a of the first light deflector 221 is directed to the first photosensitive member 30K, but the light beam B2 deflected from the second face 221b of the first tight deflector 221 is directed in an opposite direction of the second photosensitive member 30C.

The first scanning optical system 200 includes a first reflecting unit 240, which changes the direction of the light beam B2, deflected from the second face 221b of the first light deflector 221, by an angle of 180°. The first reflecting unit 240 has a first reflecting portion 241 and a second reflecting portion 242, which are orthogonal to each other. In this case, although the first reflecting portion 241 and second reflecting portion 242 may be configured as separate members, it is preferable that they be integrally formed with each other as shown in FIG. 7. With the integration of the first and second reflecting portions 241 and 242, regulation of light paths can be more easily accomplished when it is desired to change the layout of the first scanning optical system 220 according to a particular design requirements.

The first scanning optical system 220 may further include a first reflecting system 250 to extend a light-path length of the light beam deflected from the first light deflector 221. The first reflecting system 250 is installed in a light path between the first light deflector 221 and the first photosensitive member 30K.

When the first light deflector 221 is horizontally arranged as in the present embodiment, the light-path length d1 from the first light deflector 221 to the first photosensitive member 30K may be shorter than the light-path length d2 from the first light deflector 221 to the second photosensitive member 30C. The first reflecting system 250 extends the light-path length d1 from the first light deflector 221 to the first photosensitive member 30K, to assure a light-path length sufficient to accurately form an image on the first photosensitive member 30K. Also, with the use of the first reflecting system 250, it is possible to regulate the light-path lengths d1 and d2 to be equal to each other without using a separate reflecting mirror, and consequently, to improve a performance of the light scanning device 200 with a fewer number of optical elements.

As shown in FIG. 7, the first reflecting system 250 includes a transmitter member 250a, at least a part of which is coated with a reflective coating 251, and a reflecting mirror 250b arranged to face the transmitter member 250a.

The light beam B1, which is deflected from the first face 221a of the first light deflector 221, and which is directed to the first photosensitive member 30K, is reflected plural times between the reflective coating 251 of the transmitter member 250a and the reflecting mirror 250b, and can achieve an extended light-path length. By appropriately adjusting the distance between the reflective coating 251 and the reflecting mirror 250b or the angle defined by the transmitter member 250a and the reflecting mirror 250b (FIG. 7 illustrates an example in which the transmitter member 250a and reflecting mirror 250b are arranged in parallel, that is, an angle therebetween is zero), it is possible to regulate the light-path length d1 to a desired value.

As shown in FIG. 7, the transmitter member 250a is installed to the housing 210 of the light scanning device 200, and thus, also functions as a light window to prevent exterior impurities from entering the light scanning device 200. With this configuration, it is possible to reduce the number of constituent elements of the light scanning device 200, and consequently, to achieve a more compact configuration of the light scanning device 200.

The transmitter member 250a is formed with a first transmission portion 252 and a second transmission portion 253 on each side of the portion with the reflective coating 251. After the light beam is reflected plural times between the reflective coating 251 and the reflecting mirror 250b, the light beam is emitted from the light scanning device 200 through the first transmission portion 252, so as to be introduced to the first photosensitive member 30K. After the light beam, deflected from the second face 221b of the first light deflector 221, is reflected by the first reflecting unit 240, the light beam is emitted from the light scanning device 200 through the second transmission portion 253 of the transmitter member 250a, so as to be introduced to the second photosensitive member 30C.

The first and second transmission portions 252 and 253 of the transmitter member 250a may be coated with a transmission filter 254. The transmission filter 254 prevents a partial light beam diffusively reflected at the reflecting mirror 250b from being introduced to the second photosensitive member 30C, thereby reducing the generation of reflection noise.

Figure 8A:
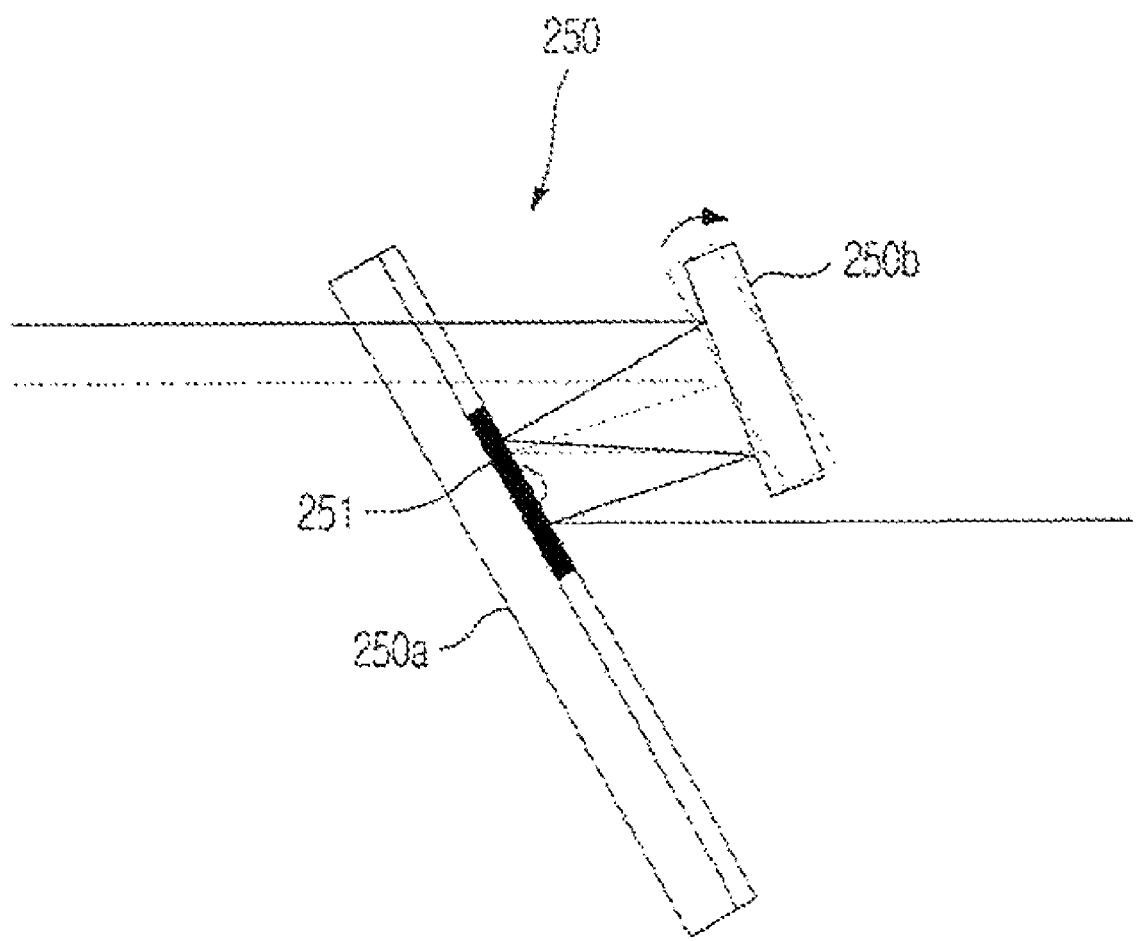
FIG. 8 is a view illustrating an example of a light path change caused by movement of a reflecting mirror.
Figure 8B:
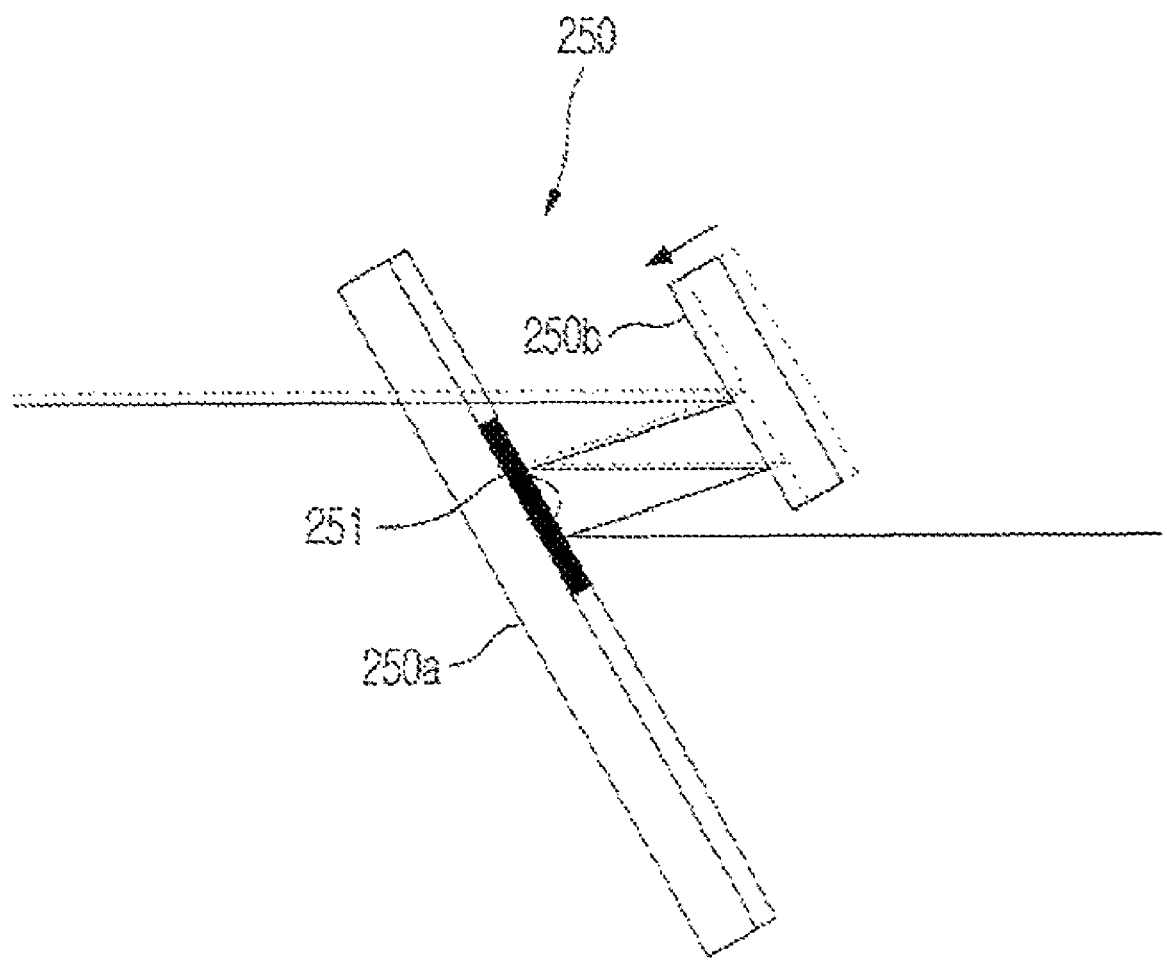

The reflecting mirror 250b may be installed movably to the housing 210 of the light scanning device 200. For example, the reflecting mirror 250b may be configured in a rotatable manner as shown in FIG. 8A, or may be configured in a linearly movable manner as shown in FIG. 8B.

With the rotatable or linearly movable reflecting mirror 250b, when it is desired to change the position of the first photosensitive member 30K or to adjust the depth of focus formed on the first photosensitive member 30K according to a particular design needs, this can be easily accomplished by appropriately adjusting the position of the reflecting mirror 250*b* to change the light path without greatly changing arrangement of other optical elements installed in the first scanning optical system 220.

The second scanning optical system 230 includes a second reflecting unit 260 and a second reflecting system 270. The configurations and features of the second reflecting unit 260 and the second reflecting system 270 are sufficiently similar to those of the first reflecting unit 240 and first reflecting system 250, and, from the above descriptions of which, will be sufficiently understood without repetitive descriptions.

Although embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus, comprising:
    a plurality of photosensitive members; and
    a light scanning device configured to irradiate light beams along a plurality of scanning lines each on a surface of respective corresponding one of the plurality of photosensitive members, the light scanning device comprising a first light deflector and a second light deflector each configured to rotate to thereby deflect one or more of the light beams in varying directions, the first light deflector being configured to rotate about a first rotational axis, the second light deflector being configured to rotate about a second rotational axis not parallel to the first rotational axis,
    wherein a first pair of the plurality of scanning lines is contained in a first plane, at least a second pair of the plurality of scanning lines being contained in a second plane different from the first plane, the first light deflector being arranged in a plane parallel to the first plane.

2. The image forming apparatus according to claim 1, further comprising:
    a plurality of developers configured to supply developing agent to the plurality of photosensitive members so as to form a visible image on each of the plurality of photosensitive members; and
    a transfer drum disposed in contact with the plurality of photosensitive members, the transfer drum being configured to support thereon a combined visual image that is formed by overlapping of the visual image of each of the plurality of photosensitive members on one another.

3. The image forming apparatus according to claim 1, wherein the plurality of photosensitive members comprises first to fourth photosensitive members, and
    wherein the light scanning device includes:
    a first scanning optical system including a first light source and a second light source, the first light deflector deflecting light beams emitted from the first and second light sources, the first scanning optical system irradiating the light beams deflected by the first light deflector to the first and second photosensitive members.

4. The image forming apparatus according to claim 3, further comprising:
    a second scanning optical system including a third light source and a fourth light source, the second light deflector deflecting light beams emitted from the third and fourth light sources, the second scanning optical system irradiating the light beams deflected by the second light deflector to the third and fourth photosensitive members.

5. The image forming apparatus according to claim 3, wherein the first pair of the plurality of scanning lines comprises a first scanning line on the first photosensitive member and a second scanning line on the second photosensitive member, the first and second photosensitive members being two adjacent neighboring ones of the plurality of photosensitive members.

6. The image forming apparatus according to claim 5, wherein a first light-path length from the first light deflector to the first photosensitive member and a second light-path length from the first light deflector to the second photosensitive member are equal to each other.

7. The image forming apparatus according to claim 6, wherein the first scanning optical system further includes a first reflecting mirror and a second reflecting mirror to reflect the light beams deflected from the first light deflector to the first photosensitive member and second photosensitive member, respectively, and
    wherein the first reflecting mirror and second reflecting mirror are arranged to satisfy the following relational expression:

$$2\theta_1 + 2\theta_2 = 180°,$$

wherein $\theta_1$ is a first incidence angle of light beam deflected from the first light deflector on the first reflecting mirror, and $\theta_2$ is a second incidence angle of light beam deflected from the first light deflector on the second reflecting mirror.

8. The image forming apparatus according to claim 7, further comprising:
    a second scanning optical system including a third light source and a fourth light source, the second light deflector deflecting light beams emitted from the third and fourth light sources, the second scanning optical system irradiating the light beams deflected by the second light deflector to the third and fourth photosensitive members,
    wherein the second pair of the plurality of scanning lines comprises a third scanning line on the third photosensitive member and a fourth scanning line on the fourth photosensitive member, the second light deflector being arranged parallel to the second plane.

9. The image forming apparatus according to claim 8, wherein a third light-path length from the second light deflector to the third photosensitive member and a fourth light-path length from the second light deflector to the fourth photosensitive member are equal to each other.

10. The image forming apparatus according to claim 9, wherein the second scanning optical system further includes a third reflecting mirror and a fourth reflecting mirror to reflect the light beams deflected from the second light deflector to the third photosensitive member and fourth photosensitive member, respectively, and
    wherein the third reflecting mirror and fourth reflecting mirror are arranged to satisfy the following relational expression:

$$2\theta_3 + 2\theta_4 = 180°,$$

wherein $\theta_3$ is a third incidence angle of light beam deflected from the second light deflector on the third reflecting mirror, and $\theta_4$ is a fourth incidence angle of light beam deflected from the second light deflector on the fourth reflecting mirror.

* * * * *